United States Patent [19]
Markman

[11] Patent Number: 5,794,213
[45] Date of Patent: Aug. 11, 1998

[54] METHOD AND APPARATUS FOR REFORMING GROUPED ITEMS

[76] Inventor: Herbert L. Markman, 631 Fariston Dr., Wynnewood, Pa. 19096

[21] Appl. No.: 469,175

[22] Filed: Jun. 6, 1995

[51] Int. Cl.$^6$ .................................................. G06F 17/60
[52] U.S. Cl. .................... 705/23; 705/22; 705/28; 705/29
[58] Field of Search .................... 364/403; 235/385; 395/201, 228, 229; 394/478.12, 478.11

[56] References Cited

U.S. PATENT DOCUMENTS

| | | | |
|---|---|---|---|
| Re. 33,054 | 9/1989 | Markham | 235/38 |
| 5,025,140 | 6/1991 | Varley | 235/385 |
| 5,114,187 | 5/1992 | Branch | 283/81 |
| 5,125,513 | 6/1992 | Branch | 209/3.3 |
| 5,443,082 | 8/1995 | Mewburn | 128/89 |

FOREIGN PATENT DOCUMENTS

| | | | |
|---|---|---|---|
| 2009989 | 6/1979 | United Kingdom | G06K 17/00 |

OTHER PUBLICATIONS

Peterson, On the Way to ID Oz, a Bar–Coded Yellow Brick Road, Industrial Launderer, pp. 37–40, Sep. 1991.
Snyder, Bar Coding Garments, Industrial Launderer, pp. 23–24, Nov. 1991.

Primary Examiner—Gail O. Hayes
Assistant Examiner—Phillip J. Groutt
Attorney, Agent, or Firm—Eckert Seaman Cherin & Mellott

[57] ABSTRACT

Articles such as garments to be cleaned are associated in a group (e.g., one customer's order). After processing together with articles from other groups, the articles are to be reassembled in their original group units. Coded labels are attached to each of the articles and identify or are cross referenced to its group, e.g., with barcodes. If articles with permanent labels are processed, group codes are assigned and stored for such articles, indexed to the permanent label information. Other articles are each labelled as to their groups. The total count or number of articles in each group is recorded, preferably on the article labels but also possibly in a data memory accessible to a data processor coupled to a scanner. For manually regrouping the articles, a scanner is used and the group identification is determined as articles are encountered. The data processor assigns and indicates visually one of a number of assembly locations to be used temporarily to store the articles for each group. As the articles are scanned and manually placed, they are counted. The data processor compares the current count with the total for that group, and signals when the group is complete, whereupon the location can assemble another group. The device can be coupled to an inventory control system or operated as a stand alone unit, particularly if the number of articles in each group is recorded on the label.

22 Claims, 4 Drawing Sheets

METHOD AND APPARATUS FOR REFORMING GROUPED ITEMS

BACKGROUND OF THE INVENTION

1. Field of the Invention

The invention relates to the handling of articles in groups that are separated and/or mingled during processing with articles of other groups, and which must be re-formed into a group thereafter. The invention is particularly applicable to articles of laundry and drycleaning, or other articles that are associated, for example, as the articles presented for processing by a given customer. After processing the articles of a number of such groups together, the articles for each group (e.g., customer) must be sorted from the articles of other groups and reassembled into their original groups for return to the respective customers. In particular the invention concerns an automated assistant for manually reforming grouped articles that can operate in a stand alone mode, or in data communication with a computerized inventory control system, or so as to collect data that is communicated in batch mode to an inventory control system.

According to the invention articles are labelled to identify or permit identification of their respective groups by automated scanning means. A record is kept of the number of articles in each group, preferably by a code carried on a label attached to each of the articles. Information as to the group identification and the number of articles in the group enable the sorting assistant of the invention to assign a location for assembling each group and after scanning the label on each article to indicate to an operator the particular location (i.e., group) to which that article belongs. Thus, a lot containing a number of commingled groups can be quickly sorted back into the original groups. In addition to signalling an assigned location, preferably by a visual signal, the sorting assistant signals the operator when all the articles of an individual group have been accounted for and the group is successfully reformed, whereupon the group is removed, freeing that location for use in assembling a next group.

2. Prior Art

In a conventional laundry and drycleaning establishment, a lot system is used to process the articles of a number of customers at the same time. The articles are labelled individually with numbered and/or color coded tags that are attached to articles, for example by a pin or staple, such that the tags are carried through the process. The numbers and color codes roll over, that is, the same colors or numbers can reappear to distinguish articles in later groups.

Each different group has at least one article, and may have any number of articles. Therefore, an indefinite number of tags of a particular color and/or number may be needed to identify a particular group (one or more articles of clothing presented by a single customer). This complicates the problem of labelling the articles and also complicates the problem of sorting the groups after processing.

Article label tags that are numbered and/or colored, etc., can be supplied in rolls or otherwise in bulk, to be used as needed for groups having different numbers of articles. The articles of each group are labelled with a distinct tag by virtue of a number and/or color combination. The available number of combinations exceeds the number of groups that the operator will process as a lot (i.e., articles from a plurality of groups that will be commingled during processing), so that it will not occur that two groups in the same lot have identical number/color identifications. The lot size is chosen by the operator as some quantity that is convenient for one reason or another.

Numerous variations are possible to define lots or to label grouped articles distinctively within each lot. For example, a lot can consist of a given number of articles, or as near to that number as possible without causing groups to be split to place their articles into different lots. A lot can consist of a given number of customer orders or groups, as opposed to the number of articles. A lot can include all the articles received on a given day or to be returned to customers on a given day. In a similar variation lots can include a morning lot and an afternoon lot. Lots can be defined by all the articles from a particular source such as a branch store served by a central facility. In whatever manner the lots are divided, it is necessary to label articles within the lot distinctively as to their groups, so that groups belonging to different customers can be correctly sorted out later.

Many variations are possible for labelling articles distinctively as to group. Typically there is an associated group identification number, which may appear on the article tag or be cross referenced to the article tag in a database (e.g., for "captive" garments such as uniforms in systems where all possible garments are provided with identifying codes distinctive to articles that will be cleaned in the future when presented in different groups). Colors can also distinguish groups, or colors can be used to distinguish lots or articles requiring special processing, for example due to fabric type, color sensitivity or some other aspect.

As a result, tagging articles and managing groups to which articles belong, present complex problems. For example, with preprinted article tags it may be necessary to provide separate sets of tags to be used for groups having a particular number of articles and separate sets having different colors to distinguish lots or other aspects. The operator thus may need one inventory of tags for one-piece "groups," another for two-piece groups, etc., and perhaps redundant sets in other colors.

To avoid the need for a large inventory of tags, articles or groups can be labelled simply with a number or scannable code, but this makes it difficult manually to re-sort the articles into groups, and may require an inventory control computer that manages which articles belong to which groups. At the completion of processing, the operator must find and recombine the articles belonging to each group. This is typically done manually, by placing articles together that have the same group number or code on the tag or in a database. When the last article of a given lot has been placed with its group companions, the mixed-group articles in the lot have presumably been sorted successfully back into their original groups. This is a labor intensive exercise even with the assistance of a computer database, and does not account for occasional accidents such as articles that have been removed during processing or inadvertently placed in a different lot than their companions.

Automated scanning of barcode or the like can be used to assist in managing groups, for example as disclosed in U.S. Pat. Re.33,054—Markman. From operator input, a data processor records data referenced to a particular customer and preferably records a description of the articles presented by the customer. At least one barcoded tag is generated for each group, and contains or is referenced to the descriptive information on the articles. An operator can scan the group tag and compare the descriptions to the articles found when reassembling groups. This is useful where the articles have conventional numbered/colored tags as above. However in addition, each article can be provided with a barcoded tag that identifies the group to which it belongs in a manner similar to the numbered/colored tags discussed above, enabling the inventory control system to monitor the articles as well as the groups.

The information entered is used to determine the price charged, and by scanning the barcoded tags as articles are returned to the customers (or otherwise pass a particular step), the data processor can keep and update records such as the physical inventory contents, the dollar value inventory of the business in progress, the amount of money expected to be in the cash drawer, the establishment's rate of throughput and so forth. If a physical contents inventory is taken, by scanning all the group tags and/or all the article tags, the processor can compare the results with stored data and determine whether groups or articles are unexpectedly missing, or perhaps determine that undocumented groups or articles are present.

According to one embodiment in the Markman patent, barcode tags are printed for each article together with the group tag, for enabling the individual articles to be monitored (as opposed to monitoring only groups and perhaps manually comparing the articles with their printed or stored descriptions) by scanning individual tag barcodes. This is also helpful when attempting to locate extra articles or to identify articles that are missing, particularly if the inventory control computer stores a description of each respective article. Space is provided on the computer generated forms for the article tags. The barcoded forms and tags for each group are printed only when the group is accepted into controlled inventory. The article tags are perforated and separated from the accompanying form representing the group or batch of articles. However, these forms must be large enough to provide a sufficient number tags for groups of many articles, even though only one may be needed, and for smaller groups many tags go unused. This presents a problem similar to that of colored/numbered tags due to the wide range of possible article counts in each group. The operator may need to keep a large variety of distinct tags; or may waste available tags or stationery; or may need to maintain and reference a complex database accounting for and cross referencing numerous articles, groups, lots and the like. The operator's choice among these alternatives affects the relative ease, difficulty and/or expense with which tagged articles can be re-formed into their original groups later.

The barcode or other data on the tags is substantially unique least to the group but also potentially to the individual articles within the group, so that articles can be distinguished from one another and/or so that descriptive data stored relating to the articles can be referenced to compare the physical articles to the descriptions in memory. Another known kind of article labelling in connection with inventory control and reporting is permanent barcode labelling of articles such as garments. Permanent labelling of each article (or perhaps classes of articles such as shirts) is helpful if return business is expected from individual customers or in the case of captive garments (e.g., regularly cleaned uniforms or the like). A permanent data record is kept for each customer article to which a permanent label has been attached and can be referenced when an article is received in a group and when attempting to re-form the group. For these permanently labelled garments, an additional article tag is not necessary, but a large and accessible database is required to be set up and maintained, including article description and/or customer information for each article. This is effective but requires substantial memory and data processing as compared to a system in which a less complicated labelling system is used.

A permanent label is typically heat sealed or sewn into a garment and must be sufficiently durable to survive many cleaning cycles while the printing on the label remains readable or scannable. A less permanent article label can be provided as needed to survive one cleaning, or a limited number of cleanings, while remaining readable or scannable. Scannable "one-ride" tags are known and are made and printed using materials having the necessary wet strength or resistance to solvents to survive and remain readable. For this purpose, various polymer or natural fiber materials can be printed with scannable codes identifying the article or the group to which the article belongs. Such tags have conventionally been printed with group numbers, lot numbers, descriptions of the associated articles and due dates for retrieval by the customer.

An article labelling system for reassembling groups requires a distinct group or transaction code, which can be scannable or cross referenced to a scannable code (e.g., a unique garment identification code on a captive garment). Thus the articles of a group might be identified NNNN-shirt, white; NNNN-dress, red; NNNN-slacks, green, etc., where "NNNN" represents the group. Unless all the articles are captive and uniquely labelled and cross referenced, one or more articles are tagged with the group identification. The tag is typically printed in both barcode and readily-read alphanumeric code. Where a processing establishment handles articles from various sources (e.g., store branches), it may also assist in regrouping the articles to include a name or code identifying the source. When re-assembling groups, the operator either reads or scans the codes on the articles and places those of the same groups together. When all the articles have been placed with a group, then presumably each of the groups has been completely assembled. Where a group or transaction tag is available, or where the contents of the groups are stored in memory, a final step can be to compare the assembled articles of each group with the printed or stored records to verify that each group is complete and is neither missing articles nor holding an article belonging to another group. This is a painstaking job.

Sorting conveyors are known for diverting individual items from a stream of items automatically. For example a trap-door arrangement or other diverting mechanism can be operated automatically when the items pass for separating the items for one reason or another. Such a sorting mechanism can be applied to sorting laundry articles. However, automated sorters are also complex and any savings in human effort may be more than paid by the expense of the hardware and software involved. Inventory control system with numerous barcode scanners, cross referenced data tables for article numbers or customer/garment numbers, automated diverting mechanisms and the like are possible. However, an inventory control system having very sophisticated capabilities also requires a good deal of work to enter and maintain the data tables and records. What is needed is a system that assists in regrouping articles that is useful over a wide range of situations, from a very sophisticated system to a virtually manual one, with minimum waste of tags or inventory of tags, and minimum effort in reassembling groups. The present invention provides this capability in a labelling system preferably for one-use article labels, by encoding the group or batch code and a code representing simply the number of articles in the group. As a result, regrouping of articles can be accomplished simply and quickly, without the need for substantial data processing, memory and the like.

SUMMARY OF THE INVENTION

It is an object of the invention to assist in substantially manual assembly of groups of separated articles, by reading a group identification code and referencing information on the number of articles in each of a plurality of groups, then using a processor to select and indicate an available location for assembly of the group, and to count the articles placed with each group until the known number is completed for a given group, whereupon the operator is signalled that the group is complete.

It is another object to label articles of groups with the number of articles contained in the group as a means to facilitate assembly, especially when using automatic scanning to read the group number and/or the article count.

It is also an object of the invention to assist in regrouping articles in a way that is at least sometimes in data communication with an inventory control system and can accommodate some permanently labelled articles, but is also useful standing alone.

It is a further object of the invention to reduce the waste and expense associated with article tags by consuming only the number needed for a particular group, and by avoiding any need for a stock of distinct prepared tags.

It is also an object to automate assembly of groups of articles from commingled groups of articles in an inexpensive and convenient manner.

These and other objects and aspects of the invention are provided in for associated articles such as garments to be cleaned, which are associated in a group (e.g., one customer's articles), are separated from other members of the group and mixed with other articles and groups during processing, then are regrouped in their original units. A label generator prints labels for at least some of the articles, to identify the associated group. The total number of articles contained in each group is recorded, preferably on the article labels but also possibly in a data memory. When regrouping the articles, the group identification of each article is read in turn, preferably by scanning a barcoded group code and article count. For the first article of a group, a data processor selects and signals which of a number of locations or receptacles will be used to temporarily store the articles for that group. The processor indicates that location whenever another article of that group is encountered. The processor also compares the count of accumulated articles of the group with the total number for that group, and signals the operator when the group is complete. The device can be coupled to an inventory control system monitoring the status or location of the articles, or the device can be operated as a stand alone unit, particularly if the number of articles in each group is recorded on the label.

The invention can be more or less complicated in various embodiments, in a minimal embodiment, for example, having a label printer operable to produce alphanumeric labels showing the number of articles in each group on the labels for all the articles in the group, for assisting an operator in regrouping them later. Such data can be entered by keystrokes when regrouping the articles. In a more automatic embodiment, the group codes and article count are printed in barcode by the label printer and scanned by the operator using a hand held scanner coupled to the processor. In a more automatic embodiment the label printer and regrouping assistant scanner are coupled to an inventory control system, and in that case the group identifier code is placed on the labels and the count of articles in the group can be referenced by the group code to an article count stored elsewhere in the inventory control system. In systems having uniquely identified articles (e.g., "captive" permanently labelled garments), the articles can be assigned a group code when received into controlled inventory and counted together with articles that are labelled with the group code. When regrouping, the group code and article count is referenced as stored in memory, for assisting in sorting the uniquely identified articles together with those labelled by group.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
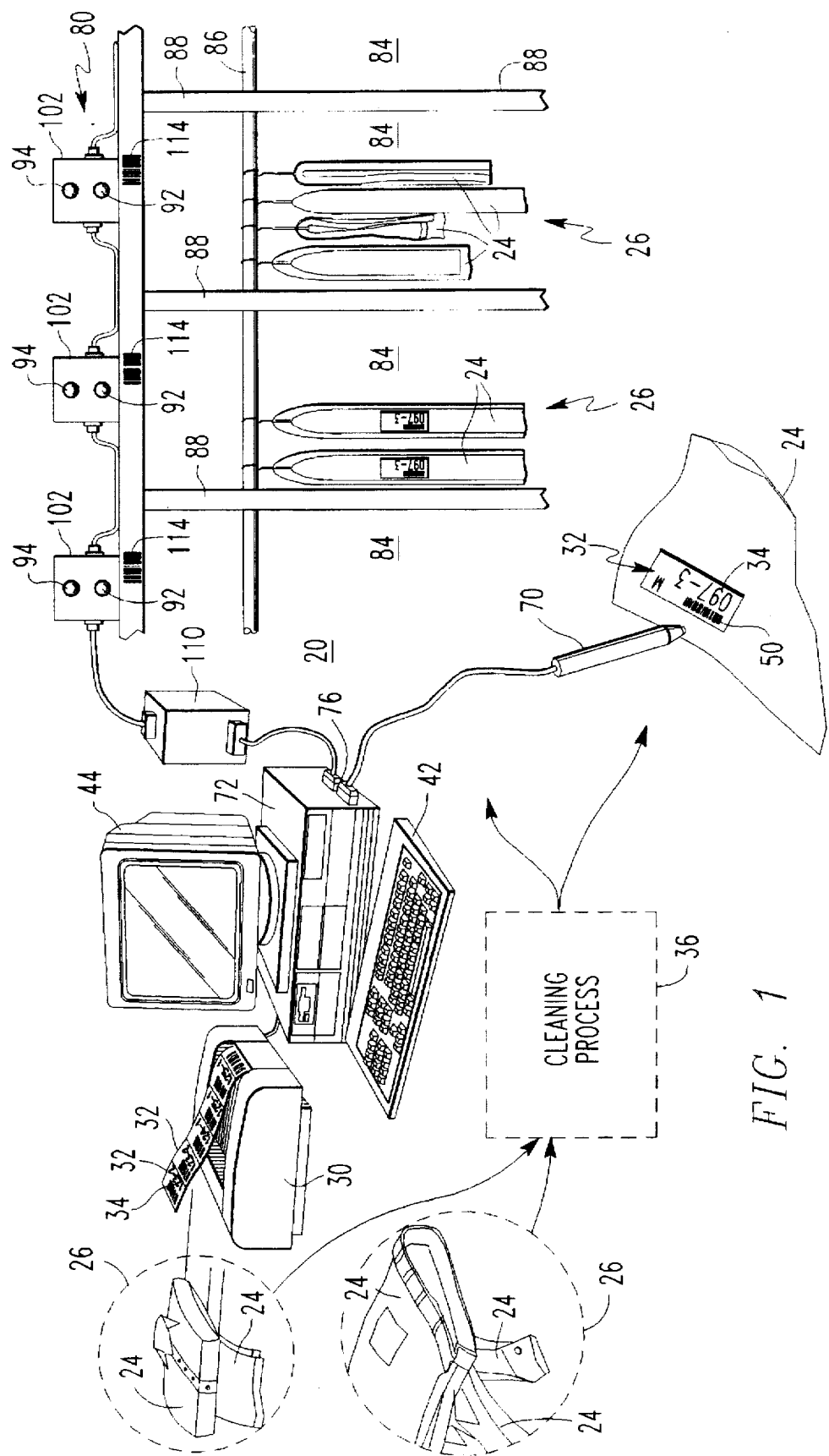
FIG. 1 is a partial elevation view functionally illustrating the apparatus of the invention.

According to the invention, an automated assistant 20 as shown generally in FIG. 1 is provided for aiding an operator in managing articles 24 in groups 26 that become commingled with articles belonging to a plurality of groups and thereafter are reassociated with the articles of their original group. To this end, the number of articles 24 in each of the groups 26 is recorded before the groups are commingled. A label printer 30 produces a label 32 for each article 24, having an identification code 34 that is unique to its group, at least within the groups to be commingled. When the groups 26 are reassembled after processing of the articles 24, for example through cleaning process 36, the sorting assistant 20 uses the group identification codes 34 from labels 32 to determine the group 26 to which each article belongs, and assigns and indicates a discrete location at which the article is to be placed. Whereas the recorded number of articles is available, assistant 20 also determines by counting articles 24 passing for each group during reassembly, when the respective groups are complete, signalling that a completed group can be removed to free the location for accumulation of another group 26.

The invention is particularly useful for garments to be cleaned or dry cleaned. Garments are presented by customers in groups which each form an order having an indefinite number of articles. The garments of many customers are processed (e.g., cleaned) together in a lot. The original groups (customer orders) are then reassembled and returned to the customer. The invention is also applicable to other situations in which articles belonging to different groups must be segregated into groups for which they are intended.

The articles are labelled with a sufficiently unique code 34 to distinguish among the groups 26 that are processed together. In the embodiment shown in FIG. 1, at least the number of articles 24 for each group 26 is entered by an operator on an input means such as keyboard 42, coupled to a controller 44 operating label printer 30. Label printer 30 can generate a label 32 for all articles 24, which includes identification code 34 for that group.

For operations capable of processing at least some articles that are already uniquely identified, for example with a unique article identification code referenced to a particular customer in an inventory control system memory, that article identification code can be scanned initially, and a group code assigned to the article for this round of processing. Whereas the article is already uniquely identified, it can be processed together with other articles without requiring an additional group identifier code label, the required information being stored in memory and cross referenced to the article identification.

Preferably, the group code includes scannable indicia 50 on a label for some or all of the articles in a lot, e.g., interleaved two-of-five barcode, or code-39 barcode or another scannable code. Preferably the number 52 of articles 24 in the respective group 26 is included in the scannable code 50 for each of the articles 24 in the group. If applied to the labels, the article count enables the sorting assistant to operate independently of a complicated inventory control system, as discussed below. However the invention is applicable as an extension of an inventory control system, and is also applicable to a system in which the article count and/or group identification is stored rather than printed on the labels.

The labels 32 are attached and remain attached to articles 24 through the process 36 of cleaning or the like. Each article has either a group label or a unique article identifying label cross referenced to its group. Accordingly, the labels 32 should be sufficiently durable to survive at least one pass through the process. Various materials for the label and its printing, made of polymers, natural fibers, high rag content paper labels or the like can be used. The labels can be attached to the articles by any convenient means such as pins, staples, heat sealing, adhesive backings or the like.

According to one embodiment, the count or total number 52 of articles in each respective group 26 appears on the scannable indicia 50 of each label and thus each article in the group. Alternatively, the total number 52 can be recorded only on at least one of on the labels 32 for the group. As another alternative, in an embodiment where the label printing unit 30, 44 at the input side of the process is in data communication with the assembly station at the output side of the process, or perhaps where data can be transferred on disk or the like, the number of articles in each group can be stored in a data memory to which a data processor 72 on the output side of the process is coupled at least for batch transfer of article counts for the groups. As a further alternative, the total count and group number can be referenced to a unique article identification code. In any event, the number 52 of articles 24 in each group 26 is accessible at the output side to assist in completing the manual reassembly of the groups.

Figure 2:
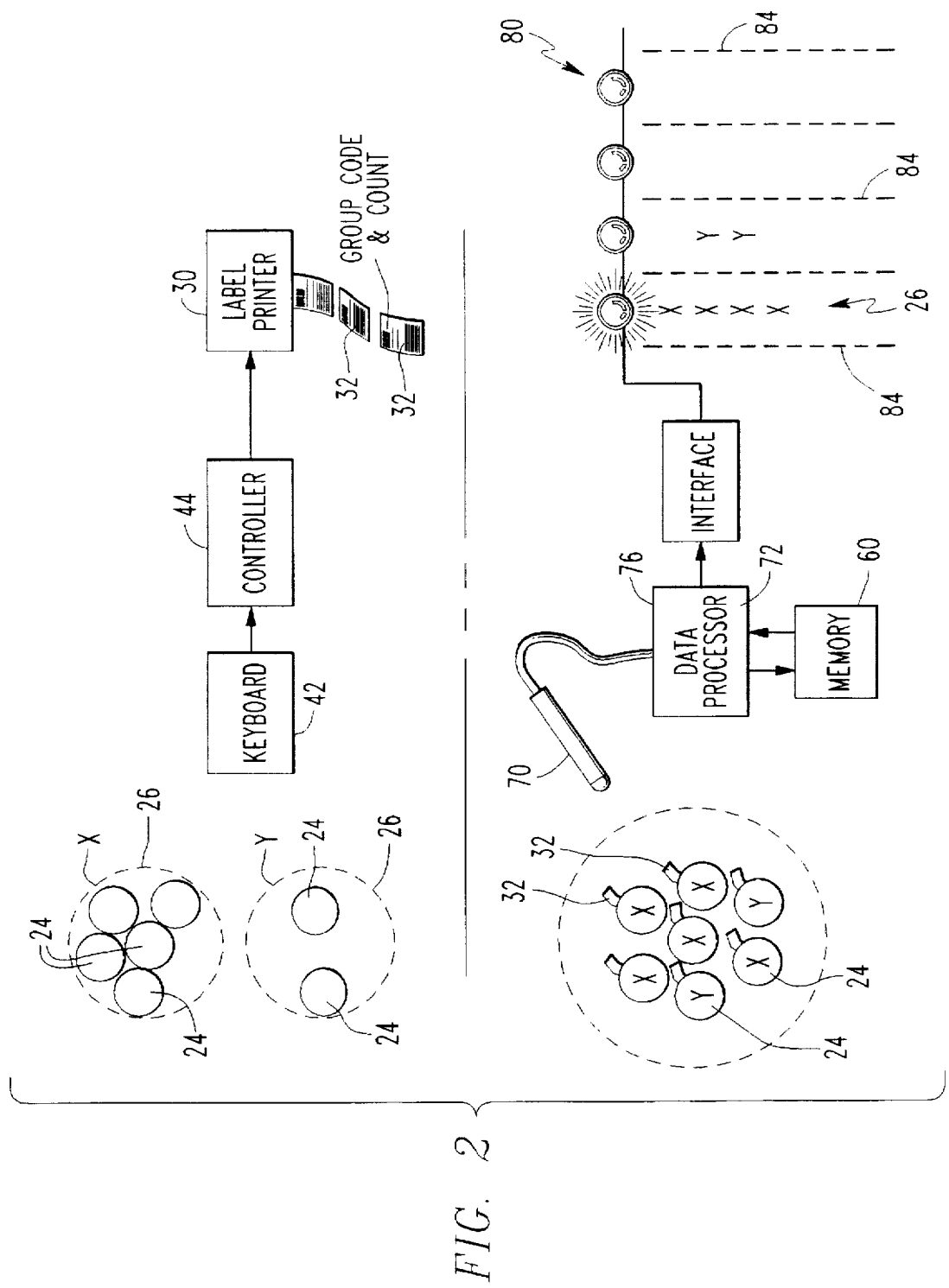
FIG. 2 is a block schematic diagram corresponding to FIG. 1 and showing commingling and reassembly of two groups.

On the output side of the process, a data input means 70 is coupled to the data processor 44, for entering from labels 32 the identification 34 of the group 26 to which each article belongs. In the embodiment of FIG. 1, the same data processor 44 is used to produce labels 32 and to manage the output side reassembly. In the block diagram embodiment of FIG. 2, a separate controller 44 and data processor 72 are employed. In other respects the same reference numbers have been used throughout the drawings to identify corresponding hardware or functional elements.

In the preferred embodiment employing optical scanning, a scanner 70 is coupled to the data processor 44 or 72 for this purpose. Alternatively (and less conveniently), the group identification 34 can be entered using keystrokes on a keyboard (e.g., 42). The recorded total number of articles for each of the groups 26 is indexed with the group identification 34 in the data memory 60 of the processor (see FIG. 2).

Data processor 72 or 44 has at least one output 76 arranged to operate indicators 80 for pointing out selected ones of a plurality of discrete storage locations 84. The locations 84 can be, for example, provided along a hanging bar 86 subdivided by partitions 88 and having at least one visual indicator 92 for each partitioned location 84. Alternatively, or in addition, numerical readouts can identify numbered locations or cubicles (not shown), and/or an audio signal can be provided to draw the attention of the operator to the selected location. Preferably, at least one LED indicator is provided at each position 84 for signalling an instruction to place a next article at the indicated position. The indicator is operable in a distinct mode, or an additional indicator or indicator is provided, for signalling when the article count is complete. This can be accomplished, for example with a red LED and a green LED at each position 84, or with some other arrangement such as a seven segment numeric readout showing both the present count and the group total count (e.g., "1 of 3" then "2 of 3" and so forth).

As each article 24 of the commingled set of groups is encountered and its identification code 34 is entered (preferably scanned), data processor 60 or 44 searches its memory 60 to determine whether the particular article is the first article encountered in its group. If the article is a first of its group, data processor 72 selects an unoccupied one of the storage locations 84 and operates the associated indicator 92. If the article is not the first of its group, the data processor selects the storage location 84 already assigned to one or more previous members of the group and operates that indicator 92.

As the group identification of each article is entered in turn (or looked up for uniquely coded articles), data processor 72 counts the articles 24 that have been assembled for the respective group. The count of assembled articles is compared to the recorded total number for the group (which could be one or many). When the assembled count is equal to the total number that was entered at the input side, and preferably printed as a scannable code 52 on labels 32, data processor 72 operates the indicator 94 at the location of the completed group to signal the operator that the count has reached the total number and the group has been successfully assembled.

The completion signal can be any signal that will alert the operator to the particular location 84, in a manner that is distinct from the location identification signal otherwise used to draw the operator's attention to the particular location. For example, a single indicator light 92 or 94 at each location 84 can be operable in distinct modes such as steady versus flashing, bright versus dim, etc., for location identification and completion signalling, respectively. Two or more indicators 92, 94 can be provided for distinctly signalling location and completion. A location indicator can be operated in conjunction with an audio completion alarm, and so forth. Moreover, completion signalling can be accomplished in a manner not limited to a signal occurring at the point of completion. For example, the completion signal can be operated upon placement of the next-to-last article, etc. In that case, instead of placing the last article and then immediately retrieving it together with its completed group, upon scanning a last article the operator can be signalled to remove the contents and rejoins it with the last scanned article to complete and remove the group. Similarly, groups consisting of a single article can be signalled as a complete single-article "group" when they are encountered, to avoid needlessly placing and immediately removing that one article.

Figure 3:
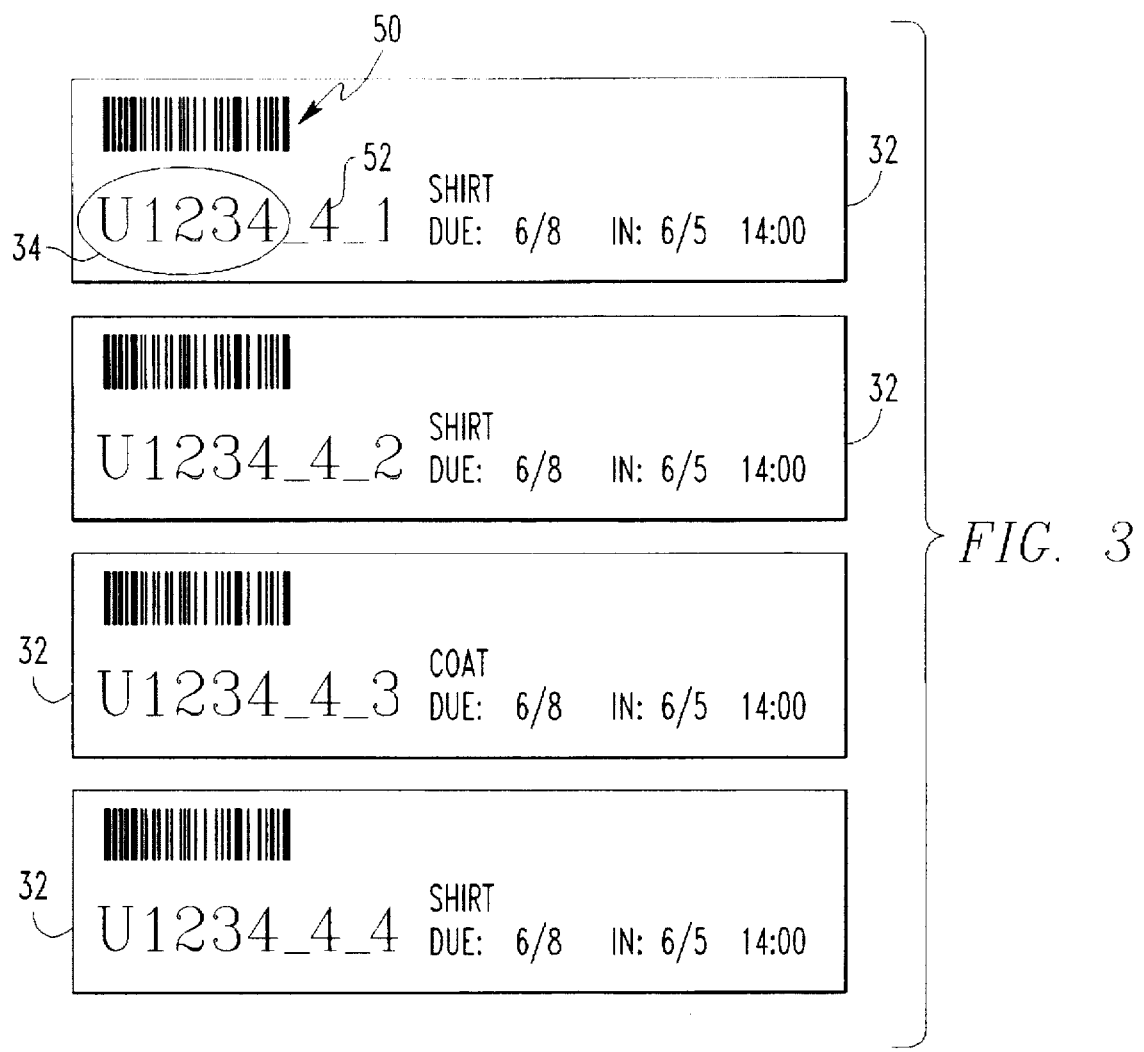
FIG. 3 is an elevation view showing exemplary article label for a group of four garments.

Preferably, the identification of the group and the total number are recorded at least partly in optically scannable code 50 on the labels attached to each of the articles. FIG. 3 shows a series of exemplary article labels for a group 26 having four articles 24. Thus, the data input device 70 coupled to data processor 60, 44 includes a scanner for reading the scannable code 50. As shown, it is also possible to provide additional information on the label, such as an alphanumeric version of the group identification 34 and article count 52, for alternative keystroke data entry for labels which cannot be successfully scanned. A description of the article can be included, which is useful if a label should become detached and needs to be reattached to the appropriate article. Other information such as a code identifying the source of the order, e.g., a branch location served by a centralized cleaning facility, may be useful. A serial article count may also be included (e.g., "1 of 3," "2 of 3," "3 of 3," etc.).

The invention is operable with or without a larger inventory control system. If the total article count 52 is encoded on at least one article label 32 in each group 26, and the group identification codes 34 are unique within the commingled groups being processed as a lot, it is not necessary to provide data communications between the input and output sides of the process in order to employ the sorting assistant of the invention. In the event that the total article count 52 is not provided on all the labels 32, the count can be communicated to the data processor 72 when one label containing the count is scanned, and comparing of the current count to the total can commence at that point. Preferably, however, the total count 52 is included on each label 32, or in a system linked to an inventory control system the total count is always available as indexed to the group or article identification code.

Figure 4:
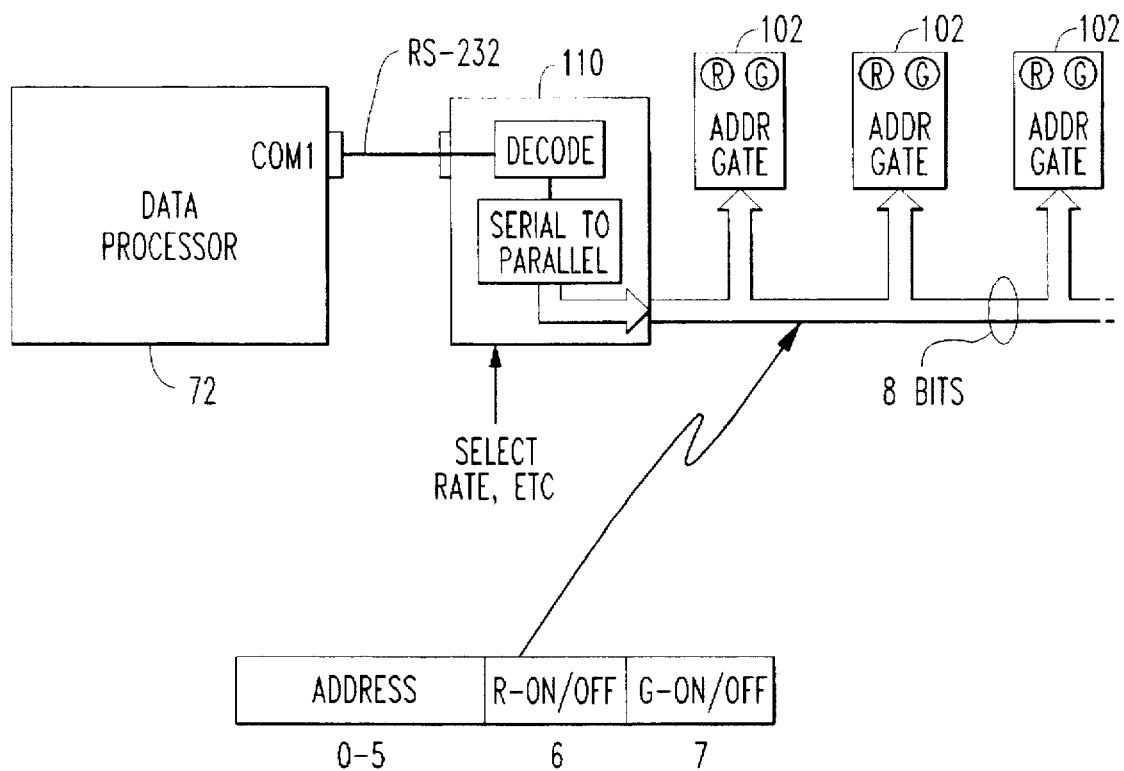
FIG. 4 is a block diagram showing a preferred output arrangement for operation of indicators.

The temporary storage locations 84 have spaces for the articles of a plurality of groups, preferably sufficient to place all or a substantial proportion of the groups 26 of a lot into an assigned location before the space is exhausted. In a preferred embodiment, capability is provided to count and signal for 64 concurrently processed groups 26 for the example of a laundry and drycleaning establishment, and two distinctly colored visual indicators 92, 94 are provided for each location. Different operations may have varying physical arrangements for accumulating articles when regrouping them, and accordingly the signalling arrangement is preferably modular, as shown in FIGS. 1 and 4.

Processor 72 can comprise a simple programmable controller, microcomputer, personal computer or motherboard, for example having an RS-232 serial port for bytewise signalling to control up to 64 dual light modules 102 connected to an interface box 110 in a daisy chain arrangement using standard eight wire telephone cables and jacks. The processor 72 signals via the serial port to the interface box 110, for example at a switch-selectable baud rate and/or protocol. Each byte of data can contain a numeric address identifying a single module, one or both of whose indicators are to be activated to identify an available space for a group or to identify a completed group. Interface box 110 functions as a serial to parallel converter as shown in FIG. 4, and can also function as a multiplexer by successively addressing modules 102. Of course, parallel signalling arrangements, serial shift register arrangements and the like could also be used to control the visual indicators.

In a preferred embodiment with 64 modules, each containing a green LED for location identification and a red LED for completion signalling, the output of interface box 110 contains six bits for addressing a particular one of sixty-four modules 102 (i.e., location 84) and two bits for on/off signalling of the red and green LEDs, respectively.

When a module 102 is addressed, gating in the module applies the signal then present on the red and green signalling bits to switch the LEDs on or off. For single module signalling, the interface box can hold the address and signal lines in the required states, or in a multiplexed arrangement, the modules can include latches coupled to the LEDs for retaining the state of indication from the last time they were addressed, enabling more than one module's indicators to remain on at the same time (e.g., the completion indicators). Upon power up, all the modules 102 are reset.

The location indicators 92 are selected and activated upon scanning the first article 24 from a group and when additional articles for that group are encountered. The location indicators 92 can be activated and remain activated until a next article 24 is scanned (it being assumed that because a new article has been scanned, the previous article has been placed where indicated, and the count is incremented). Alternatively, a pushbutton (not shown) can be provided on the indicator modules 102 for signalling back to processor 72 that the article 24 has been placed. As another alternative, the operator can be required to scan a barcode 114 on the location 84 to confirm placement of the article at that location. Similarly, the completion alarm or indicator 94 can remain activated until a next article 24 is scanned or can be operated momentarily or provided with a resettable latch means or the like.

In a preferred embodiment, a distinct signal is provided when a location is first assigned to a group. For example, both LEDs 92, 94 can be activated when a location 84 is assigned and no article 24 has been placed there as yet, or perhaps the location indicator can be blinked. This helps in the initial placement of articles into slots by distinguishing the particular article as the start of a new group. The operator otherwise looks for both an activated location indicator 92 and a previously placed garment 24. The completion indicator 94 is preferably activated until the operator scans the bar code 114 identifying the location 84 or module 102 as a signal that the group has been removed and the location is again available to begin accumulation of a new group.

Provision can be made for moving a partial or complete group 26 from one location 84 to another. For example, certain articles may have been removed from the balance of the lot for special processing steps, such that the associated group cannot be completed until the removed article is returned. When attempting to regroup the articles in that case, one or more groups remain incomplete when the last article found in a lot has been placed. Such incomplete groups can be assigned to special locations 84 (e.g., the most peripheral ones) and carried forward from lot to lot until the missing article(s) catch up to complete the group.

Signalling from the interface box 110 to the modules 102 can be unidirectional for simple control of the LEDs 92, 94, or bidirectional for signalling back to processor 72. A return signal to the processor can be used to indicate that the interface box 110 is -present (i.e., powered and plugged in), or when an article has been placed in a particular location, when a group has been removed, etc. The interface box also can be arranged to signal if a framing error occurs at the RS-232 port. In that event the state of the indicator lights is not changed and the device waits for a valid data command. A framing error might occur, for example, if the wrong baud rate is set such that a stop bit is not detected where expected, and in the embodiment shown could otherwise cause erroneous operation of the indicators.

On the input side of the process, the label printing arrangement can be more or less complex. Label printer 30 need only generate labels 32 under operator control in the number needed for the articles 24 and containing the group identification 34 and preferably article count 52. The article count can be entered by the operator via a keyboard 42 as shown, or can be determined by an automated counting device such as an optoelectronic light source/receiver arrangement (not shown) having a path broken by articles tossed through the beam, with the operator signalling the end of a group via a switch. The controller 44 for the printer can accept input from the operator (such as article description, source, etc., as above) or can simply cycle through group numbers in some order whereby the same group identification does not often reoccur.

Controller 44 and printer 30 can be of any type capable of forming the required characters on a durable ticket stock, and need not be coupled to the output side of the process. An exemplary printed ticket is shown in FIG. 3. Preferably, the characters include scannable indicia 50. An appropriate controller is the Computerwise model TT5B, which can control the printer to provide tickets with or without barcode as well as accept scanner input and provide control signals to the visual indicators. As discussed above, the invention can also be incorporated into a more capable full blown inventory control computer system.

An appropriate printer is the Epson TM-300B dot matrix printer, including a cutter (not shown) for detaching the individual tickets 32 from a continuous roll of stock. Various other types of printers are also possible. In addition to article labels 32, the printer can be arranged to produce a summary ticket (not shown) for the customer's order or other group, for example including information such as a customer name or identification, a list of the article descriptions, a due date, associated charges and the like, some or all of which can also be printed on the tickets for the articles as shown in FIG. 3.

The invention provides an automated method to assist in manual handling of articles 24 of various types, that are associated with one another in groups 26. The method can be more or less automated by hardware and/or software to accomplish certain steps, the remainder of the steps being accomplished with some human intervention. In a simple configuration, the method includes recording a total number of articles 24 in each group 26, from data entry or other counting means. Each of the articles is labelled with a code 34 identifying the group to which the article belongs, or if articles are included with permanent labels they can be cross referenced to their group. For assembling the articles into their groups, reliance is placed on the group code 34, preferably on the labels on the articles, and on the count 52 of the articles. An available temporary storage location 84 is chosen from a plurality of storage locations when encountering a first article 24 in each group 26. This article and subsequent articles are placed in their respective storage locations 84 for the groups while concurrently counting assembled articles for each group as each article for that group is scanned and placed, using the group identification code to trigger counting. By carrying this count using automated means and comparing the count for each group to the total number, it is possible not only to guide the user to the correct placement of every article 24, but also to indicate when the count reaches the total number 52 for each respective group, thereby managing the assembly process in a convenient and inexpensive manner.

According to the foregoing embodiments, the input (label generation) and output (assembly) sides of the arrangement need not be in data communication unless necessary to communicate the article count for each group to the processor 72 handling the assembly side, effectively requiring (as in FIG. 2) one processor or controller at the input for control of printer 30, and another at the output for control of the indicators 92, 94. It will be appreciated that label generation and indicator control can be functions of a single processor 44 as in FIG. 1. Moreover, the foregoing printer and indicators can be coupled to an inventory control and reporting system such as that disclosed in U.S. Pat. No. Re.33,054—Markman, the disclosure of which is hereby incorporated, with the functions according to the invention accomplished using the processor therein. According to one embodiment in the patent, individual articles within a process are monitored in an effort to identify extra and missing articles, and a running inventory of articles and the associated charges are kept or are obtainable by scanning codes associated with the articles or with groups of articles having descriptions of their articles recorded. The present invention can be merged into such a system, for example, by using the completion of a reassembled group to trigger appropriate changes in the inventory records. In addition, the article counting, label generation and serial port signalling functions needed according to the invention are available or readily provided as features of the inventory control system.

The scannable label embodiments have been discussed with respect to optically scannable barcode. Other optically scannable indicia can be used as well, as can electrically encoded scannable indicia such as RF or magnetically encoded tags. Alternatively, a less sophisticated encoding is possible, such as coding shown alphanumerically and entered by keystrokes.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A system for assisting in manually regrouping associated articles from a plurality of groups of articles, said articles being cleaning articles, the system comprising:

a label generator operable to print labels for the articles, the labels including an identification of the group;

means for recording a total number of articles contained in the group, the total number being recorded at least one of on said labels and in a data memory;

data input means coupled to a data processor, for entering from the labels the identification of the group, wherein the recorded total number of articles for each of the groups is accessible to the data processor, and wherein the data processor is operable for each article to count the articles assembled for a respective group and to compare a count of the assembled articles to the total number for the group, a first indicator coupled to the data processor for at least one of visually and audibly signalling a user when the count reaches the total number.

2. The system for assisting in regrouping associated articles of claim 1, wherein the identification of the group and the total number are recorded at least partly in optically scannable code on the labels attached to each of the articles, and wherein the data input means coupled to the data processor comprises a scanner for reading the scannable code.

3. The system for assisting in regrouping associated articles of claim 1, wherein the total number is recorded on at least one of the labels associated with the group, and wherein the total number is entered into the data processor from said at least one of the labels.

4. The system for assisting in regrouping associated articles of claim 1, further comprising a temporary storage apparatus having space for the articles of a plurality of groups, and a second indicator coupled to the data processor, the processor being operable to at least one of visually and audibly signal via the second indicator an available space for a group upon scanning a first article from the group, and to signal via the first indicator when the count for each respective group reaches the corresponding total number for said group.

5. The system for assisting in regrouping associated articles of claim 4, wherein the processor is operable to signal via at least one of the first and second indicator upon scanning of each article, the space for the group to which the article belongs.

6. The system for assisting in regrouping associated articles of claim 5, wherein the first and second indicator comprise means for operating a single indicating device in distinct modes, the indicating device having a group indicating state for indicating a location for a scanned article, and a finished indicating state activated when the count equals the total number.

7. The system for assisting in regrouping associated articles of claim 5, wherein the articles are garments.

8. A method for computer assisted manual handling of articles associated with one another in groups, said articles being cleaning articles, comprising the steps of:
labelling each of the articles with a code identifying the group to which the article belongs;
counting and recording on at least one of an article label and a data memory, a total number of articles in each group;
entering for each article the code identifying the group;
processing the articles and then regrouping the articles according to the code on the articles, by automatically providing at least one of a visual and audible indication of an available temporary storage location from a plurality of storage locations when encountering a first article in each group, manually placing subsequent articles in respective storage locations for their respective groups, concurrently counting assembled articles for each group when each article for that group is placed; and,
comparing the count for each group to the total number and providing at least one of a visual and audible indication when the count has reached the total number for each respective group.

9. The method of claim 8, comprising labelling the articles with the total number.

10. The method of claim 9, wherein the group identification and the total number are attached to each article via a scannable code label.

11. The method of claim 8, comprising recording the total number in a data memory and referencing the total number for said comparing step.

12. The method of claim 8, further comprising reporting the group identification to an inventory control system after the count equals the total number.

13. A method for computer assisted manual handling of garments to be processed in groups, comprising:

assigning a substantially unique group code to garments in each of the groups;
labelling each of the garments with a scannable indicia representing the unique group code to distinguish its group from other groups;
counting and recording in at least one of the scannable indicia and a data memory, the total number of garments in each of the groups;
processing the garments including commingling the groups;
scanning the indicia of individual garments for each garment in turn to determine its respective group;
automatically assigning and at least one of visually and audibly indicating one of a plurality of garment assembly locations upon encountering a first garment belonging to a respective group, and placing said garment at said assembly location;
proceeding to scan, indicate and manually place the garments while concurrently counting the garments assembled for each group at the respective locations, and comparing a count of the garments to the recorded total number of garments for each group; and, automatically providing at least one of a visual and audible indication when the assembled garments for each group are equal to the total number of garments for that group.

14. A system for assisting in manually regrouping associated articles from a plurality of groups of articles, said articles being cleaning articles, the system comprising:
labels for each of the articles, the labels including indicia representing at least one of an identification of the group and an identification of an associated article;
means for recording a total number of articles contained in each of the groups, the total number being recorded at least one of on said labels and in a data memory;
data input means coupled to a data processor, for entering the indicia from the labels identifying the group, wherein the recorded total number of articles for each of the groups is accessible to the data processor, and wherein the data processor is operable for each article to count the articles assembled for a respective group and to compare a count of the assembled articles to the total number for the group, a first indicator coupled to the data processor for at least one of visually and audibly signalling to a user when the count reaches the total number.

15. The system for assisting in regrouping associated articles of claim 14, wherein the identification of the group and the total number are recorded at least partly in optically scannable code on at least one of the labels attached to the articles, and wherein the data input means coupled to the data processor comprises a scanner for reading the scannable code.

16. The system for assisting in regrouping associated articles of claim 14, wherein the identification of the group is recorded on all the labels attached to the articles, and is entered into the data processor via the data input means.

17. The system for assisting in regrouping associated articles of claim 14, wherein at least one of the articles is permanently labelled with an article identification code comprising said indicia and the data processor is operable store the group identification and the total number for the group as cross referenced to the indicia.

18. The system for assisting in regrouping associated articles of claim 14, further comprising a temporary storage apparatus having space for the articles of a plurality of groups, and second indicator coupled to the data processor, the processor being operable to at least one of visually and audibly signal via the second indicator an available space for a group upon scanning a first article from the group, and to signal via the first indicator when the count for each respective group reaches the corresponding total number for said group.

19. The system for assisting in regrouping associated articles of claim 18, wherein the processor is operable to signal via at least one of the first and second indicator upon scanning of each article, the space for the group to which the article belongs.

20. The system for assisting in regrouping associated articles of claim 19, wherein the first and second indicator comprise means for operating a single indicating device in distinct modes, the indicating device having a group indicating state for indicating a location for a scanned article, and a finished indicating state activated when the count equals the total number.

21. A system for assisting in manually regrouping associated articles from a plurality of groups of articles, said articles being cleaning articles, the system comprising:
- a label generator operable to print labels for the articles, the labels including an identification of the group;
- means for recording a total number of articles contained in the group, the total number being recorded in a data memory;
- data input means coupled to a data processor, for entering from the labels the identification of the group, wherein the recorded total number of articles for each of the groups is accessible to the data processor, and wherein the data processor is operable for each article to count the articles assembled for a respective group and to compare a count of the assembled articles to the total number for the group, the data processor having an output for visually or audibly signalling a user when the count reaches the total number.

22. A method for computer assisted manual handling of garments to be processed in groups, comprising:
- assigning a substantially unique group code to garments in each of the groups;
- labelling each of the garments with a scannable indicia representing the unique group code to distinguish its group from other groups;
- labelling each of the garments with a scannable indicia representing the number of articles in the group;
- processing the garments including commingling the groups;
- scanning the indicia of individual garments for each garment in turn to determine its respective group;
- scanning the indicia of the number of individual garments in the group;
- automatically assigning and at least one of visually and audibly indicating one of a plurality of garment assembly locations upon encountering a first garment belonging to a respective group, and placing said garment at said assembly location;
- proceeding to scan, automatically indicate and manually place the garments while concurrently automatically counting the garments assembled for each group at the respective locations, and automatically comparing a count of the garments to the scanned total number of garments for each group; and,
- automatically providing at least one of a visual and audible indication for signalling to a user when the assembled garments for each group are equal to the total number of garments for that group.

* * * * *